United States Patent [19]
Marcilese

[11] Patent Number: 6,155,535
[45] Date of Patent: *Dec. 5, 2000

[54] DIAPHRAGM COMPRESSION LIMIT STOPS

[76] Inventor: Joseph Peter Marcilese, 2708 Goldfield Pl., Simi Valley, Calif. 93063

[*] Notice: This patent issued on a continued prosecution application filed under 37 CFR 1.53(d), and is subject to the twenty year patent term provisions of 35 U.S.C. 154(a)(2).

[21] Appl. No.: 08/987,524

[22] Filed: Dec. 9, 1997

[51] Int. Cl.[7] .................................................. F16K 31/126
[52] U.S. Cl. ................................................ 251/331; 92/96
[58] Field of Search ................................. 251/331, 61.1, 251/61; 92/98 R, 101, 97, 96

[56] References Cited

U.S. PATENT DOCUMENTS

| | | |
|---|---|---|
| 1,496,935 | 6/1924 | Lemmon ............................. 251/331 X |
| 1,783,281 | 12/1930 | Cox ..................................... 251/331 X |
| 3,250,511 | 5/1966 | Priese ..................................... 251/331 |
| 4,014,514 | 3/1977 | Priese et al. ............................ 251/331 |

*Primary Examiner*—Kevin Lee
*Attorney, Agent, or Firm*—Maria Erlinda C. Sarno

[57] ABSTRACT

A diaphragm-sealed valve having stops, mechanical means placed between a top and bottom plate to control assembled thickness and/or the amount of compression applied to the diaphragm which is placed between the top and bottom plate when the diaphragm-sealed valve is assembled together. The stops allow adequate compression to assure sealing while preventing overcompression because the stops prevent any further movement of the plates towards each other. Overcompression can result in reduced diaphragm life, diaphragm damage, areas of entrapment for contaminates and increases the force required to seal between the valve inlet and outlet.

19 Claims, 6 Drawing Sheets

DIAPHRAGM COMPRESSION LIMIT STOPS

BACKGROUND

This invention relates to a built-in or added mechanical means referred to as a stop, such as a solid structure built-in, protruding or extending continuously from either the top, herein referred to as bonnet, or the bottom plate, herein referred to as valve body, of a conventional diaphragm-sealed valve or a separate solid structure placed between the bonnet and the valve body during the assembly of a diaphragm-sealed valve. The stop or stops protect a flexible diaphragm placed between the bonnet and the valve body of a valve from distortion caused by applying a greater than requisite compression on the periphery of the flexible diaphragm which is synonymous to controlling the installed thickness of the periphery of the diaphragm during assembly.

Diaphragm-sealed valves are used in different industries for controlling the feeding and/or transporting of liquids from one point to another. Diaphragm-sealed valve and valve are used interchangeably herein and refer to the same. Existing diaphragm-sealed valves comes in different designs and construction. However, the main parts making up a diaphragm valve are a bonnet, a valve body, a diaphragm between the bonnet and valve body, a compressor connected to a stem and/or handle to control the amount of pressure applied to the center portion of the weir diaphragm and consequently to the pressure of the diaphragm upon the weir. Diaphragms are usually made of flexible material such as rubber elastomers, Buna-N, EPDM, EPDM with Teflon, silicone, Viton, etc. The bonnet and valve body are usually assembled with a fastener such as a screw that extends from the bonnet to the valve body or vice-versa. In the actual use of a diaphragm-sealed valve, after assembly the applied pressure and the release of this pressure from the flexible diaphragm upon the weir is responsible for controlling the flow of liquids through the inner surfaces of the diaphragm valve. Compression of the diaphragm upon the weir stops the flow of the liquid while the release of pressure from the diaphragm, allows the flow of the liquid.

Prior art diaphragm valves have the top plate or bonnet and bottom plate or valve body directly urging on the peripheral area of the diaphragm without having positive stops to control diaphragm thickness when the diaphragm is compressed between the top plate and the bottom plate during its assembly. Do not have positive stops, herein means that in the existing diaphragm-sealed valves, there are no parts attached or inserted directly between the top or bottom plates that can impede further movement of the top plate towards the bottom plate. Consequently, there is no means to control the pressure exerted upon the diaphragm which is located between the top and bottom plate.

In the assembly of conventional diaphragm-sealed valves prior to shipment, installation or use, a flexible diaphragm is placed between the top and bottom plate before the top and bottom plates are fastened to each other. To prevent the top plate, bottom plate and diaphragm from moving in relation to each other or shifting in position during storage and shipment, or to maintain external static seal during the initial installation of a diaphragm-sealed valve or during use, the top and bottom plates are pressed on the diaphragm by the fasteners used to connect the top and bottom plates. External seal or external static seal means preventing fluid leakage to the surrounding environment. With this conventional design, the amount of pressure applied on the plates during the assembly of the diaphragm-sealed valve is necessarily variable because there is no means to control or determine the pressure applied on the diaphragm because the diaphragm is flexible and easily gives in to the applied pressure. The thickness of a compressed diaphragm is indicative of the amount of pressure applied. A thin bulging diaphragm usually indicates excessive applied pressure. Excessive pressure on the diaphragm can damage the diaphragm even before use, it can cut, deform or damage the diaphragm which results in reduced diaphragm life, increased potential for internal leakage between valve inlet and outlet, excessive force required to effect a seal, increased potential for entrapped contaminants in damaged diaphragms, and reduced flow capacity due to diaphragm deformation.

It is therefore an object of this invention to provide a means for restricting the amount of pressure applied to the diaphragm during the assembly of the diaphragm-sealed valve to prevent premature wear.

It is another object of this invention to provide a means for controlling the pressure applied on the diaphragm so as not to deform the diaphragm during storage, shipment and installation.

SUMMARY OF THE INVENTION

This invention relates to a stop or stops incorporated into diaphragm-sealed valve to control the installed thickness of the diaphragm. The stop provides a means for controlling the amount of pressure applied on a diaphragm when a diaphragm-sealed valve is assembled for storage, shipment, installation, in between actual usage or during usage. It is preferably applied to diaphragm-sealed valves used in the processing of high purity fluids such as those used in pharmaceutical, food and chemical processing industries. The diaphragm-sealed valve having a controlling means comprise two plates, a top plate identified herein as bonnet having in its interior a compressor connected to a stem and a handle and a bottom plate identified herein as valve body; a diaphragm between the bonnet and valve body, the diaphragm having an outer and an inner surface; a stop, a solid rigid structure, built-in or added to a peripheral surface of the bonnet or valve body facing the diaphragm and structurally independent of the compressor, the stop located away from and not urging on the diaphragm; means for fastening the bonnet and valve body; and, means for applying pressure on the bonnet and valve body. The stops can have different designs, all of which, however, are mechanical structures placed between the peripheral areas of the bonnet and valve body to provide a barrier preventing further movement of the plates when the stop directly urges on the surface of the bonnet and valve body. Because a diaphragm is between the bonnet and valve body but away from the path of the stops, as soon as the stop touches the surface of the bonnet and valve body, the diaphragm is no longer further compressed by the plates. By controlling the height of the stop, the degree of compression on the diaphragm is likewise controlled. The preferred condition is to provide a stop of such height that when it urges on the opposite plate, the flexible diaphragm receives just enough compression to keep the valve from disassembling while maintaining external static seal but not enough to cause any physical deformation on the diaphragm or affect the flow of the liquid. Excessive compression may limit diaphragm life and performance of the valve due to reduction of the flow path and increased force needed to seal the valve against internal leakage between valve inlet and outlet.

BRIEF DESCRIPTION OF THE DRAWINGS

FIG. 3 is a side view showing a stop incorporated into existing diaphragm-sealed valve, the diaphragm-sealed valve herein shown without a ferrule.

FIGS. 4A–8A are corresponding perspective views of the various types of stops shown in FIGS. 4–8.

DETAILED DESCRIPTION OF THE INVENTION

Figure 1:
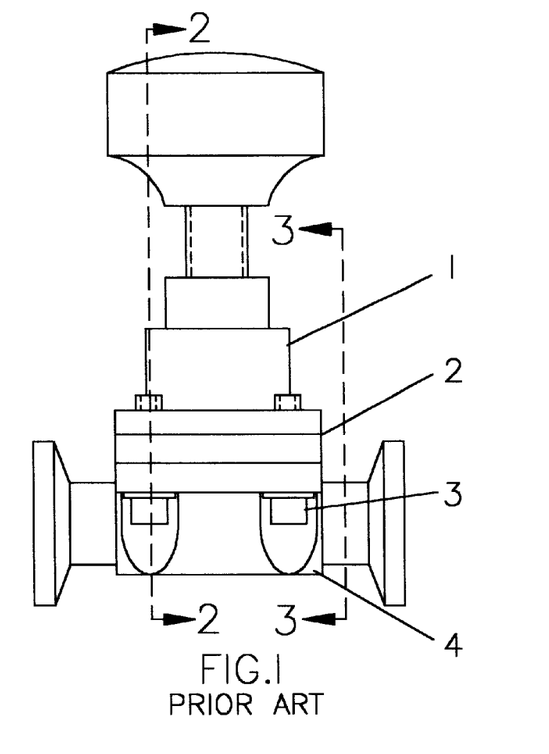
FIG. 1 is a plan view of a complete diaphragm-sealed valve of the type used in industries requiring sanitary components to maintain high purity fluids.
Figure 3A:
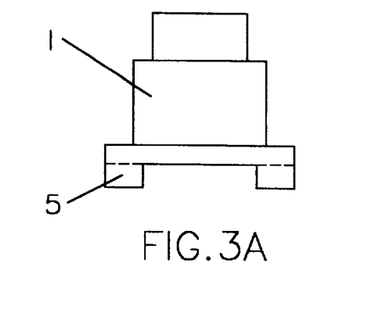
FIG. 3A is a plan view of a bonnet or top plate showing a stop of the claimed invention.
Figure 3B:
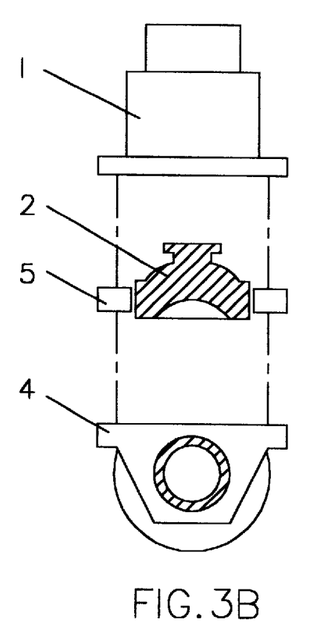
FIG. 3B is an exploded side view of a portion of FIG. 3 showing a stop as a separate component.
Figure 3C:
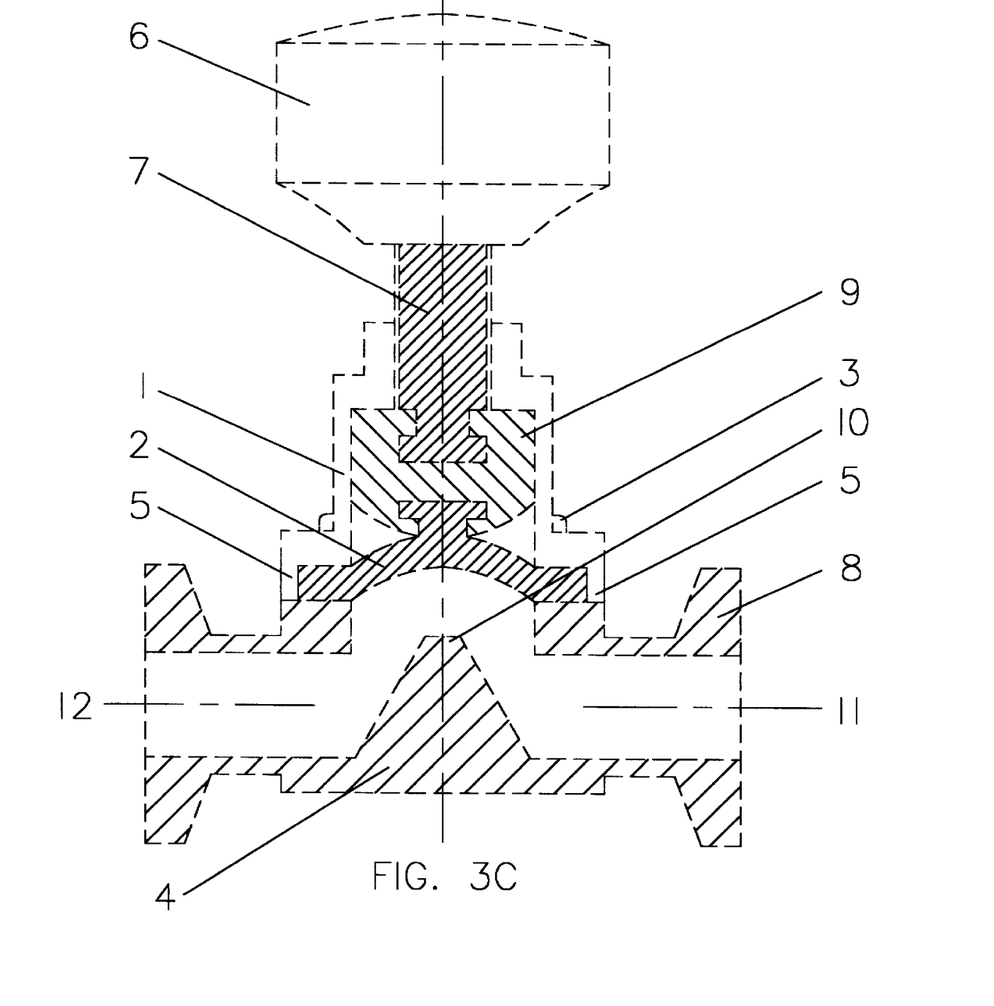
FIG. 3C is a cross sectional view of a diaphragm valve having one of the stop designs shown in FIG. 4 and 4A.
Figure 4:
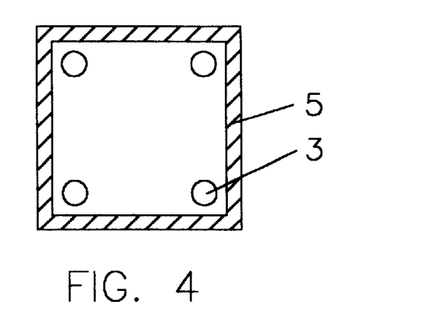
FIGS. 4 through 9 are sectional views taken along 4—4 of FIG. 3 showing various types of stop construction.
Figure 4A:
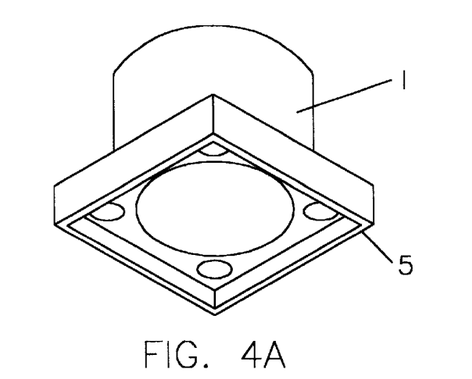

Diaphragm-sealed valves, although designed differently to cater to a particular fluid flow, all these valves, especially those used under sanitary environments, are made up of the basic parts shown in FIG. 1. The claimed invention has the same basic parts and in addition, a stop to control the amount of compression received by a diaphragm during the assembly of a diaphragm-sealed valve as shown in FIGS. 3A, 3B and 3C. The diaphragm-sealed valve herein comprises two plates opposite each other, a top plate 1, herein referred to as bonnet having in its interior a compressor connected to a stem and a handle, a bottom plate 4, herein referred to as body; a diaphragm 2 between the top and bottom plate, the diaphragm having an outer and an inner surface; a stop 5, a solid rigid structure built-in, machined or added as a separate component to a surface of a plate, either the bonnet or valve body, facing the diaphragm, the built-in or added stop located away from and not urging on the outer surface of the diaphragm; means for fastening the bonnet and valve body; and, means for applying pressure to the bonnet and valve body. Examples of fastening means are screws, nuts and studs. The other parts of the valve in the interior of the bonnet as shown in FIG. 3C, which are not directly involved with the claimed invention are the handle 6 and stem 7 which is connected to a compressor 9, the weir 10 against which the compressor 9 presses the diaphragm 2 and also released it therefrom and a ferrule 8 connected to the valve body which connects the inlet 11 and outlet of the valve to a fluid source. The stop of this invention is independent and has no direct relationship with the compressor 9 for assembling the diaphragm-sealed valve comprises the steps of placing a diaphragm between a top plate and a bottom plate having a stop component on either surface; incorporating a stop between the top and bottom plate, away from the diaphragm if the stop is a separate component; connecting the top and bottom plate with a fastener; and, tightening the fastener until the stop limits further movement of the plates towards each other. The top plate is interchangeably identified herein as the bonnet and the bottom plate is interchangeably identified herein as the valve body. Reference to a plate herein, designates either the top plate/bonnet or the bottom plate/valve body while the plates designate both plates. The fasteners preferably connect the plates away from the stop or stop component but may also pass through the stop especially for those stops added as a separate component such as that shown in FIGS. 8 and 8A.

Figure 2:
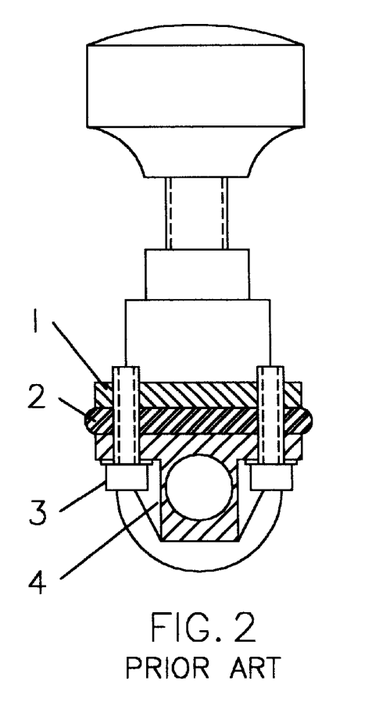
FIG. 2 is a sectional view taken along line 2—2 to illustrate how a diaphragm is clamped between the valve body and the bonnet.

The periphery of the diaphragm between the bonnet 1 and the valve body 4 provides an external static seal to prevent fluid leakage to the surrounding environment. When the diaphragm-sealed valve is in actual use, the center portion and not the periphery of the diaphragm acts as a dynamic seal to prevent leakage or flow of liquid from valve inlet to outlet. The invention proposes to accomplish an optimum external static seal. This seal is different from the dynamic seal sought during the actual operation or activation of the diaphragm. External static seal is usually achieved during the assembly of the diaphragm-sealed valve. In an external static seal, the diaphragm is compressed to a point where liquid inside the valve does not leak to the surrounding environment. Here, compression of the diaphragm is brought about by tightening of the fasteners used to connect the bonnet, diaphragm and valve body together. The tightening of the fasteners applies force or pressure to the bonnet and valve body which can be achieved for example, by tightening the fasteners with a wrench which can be manually, electrically or pneumatically driven. FIG. 2 shows the external static seal accomplished by compression of the peripheral areas of the diaphragm 2 between the bonnet 1 and valve body 4 caused by tightening the screws 3 which here are shown threaded into the bonnet 1 and valve body 4. Other known means may be used instead of screws for compressing the diaphragm between the bonnet and the valve body such as the use of nuts and studs (not shown). External static seal here does not affect the flow of liquid to and from the inlet and outlet of the valve. Actual flow to and from the valve is effected by the center of the diaphragm acting as a dynamic seal. In a dynamic seal, the actual flow of the liquid to and from the interior of the valve is controlled by the application or release of pressure by a compressor 9, also known as actuator, inside the valve bonnet 1, on the diaphragm which in turn, respectively, presses on or releases from contact with the weir 10. This mechanism allows or prevents flow of liquid to and from the inlet 11 and outlet 12 of the diaphragm valve. The fasteners involved with the external static seal do not affect the flow of the liquid to and from the diaphragm valve because they are not usually adjusted or retightened/loosened after the diaphragm valve has been assembled. FIG. 3C illustrates the situation where an external static seal is achieved as shown by the screw 3 fully fastening the diaphragm 2 between the bonnet 1 and valve body 4 without achieving dynamic seal, here shown by the central portion of the diaphragm 2 not pressing against the weir 10, thereby allowing flow of liquid to and from the inlet 11 and outlet 12.

Optimum external static seal is accomplished easily during the assembly of the diaphragm-sealed valve when a stop 5 is incorporated into the valve, such as machined either into the peripheral area of the top plate or bonnet 1 or into the bottom plate or valve body 4 or incorporated as a separate component between the bonnet 1 and valve body 4 of the valve during valve assembly. An optimum external static seal is important because it affects the eventual performance of the diaphragm when used to effect a dynamic seal.

Figure 1A:
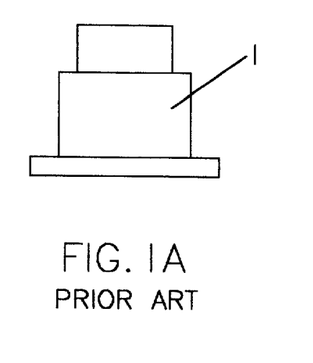
FIG. 1A is a plan view of the top plate or bonnet isolated from the complete diaphragm-sealed valve of FIG. 1.
Figure 1B:
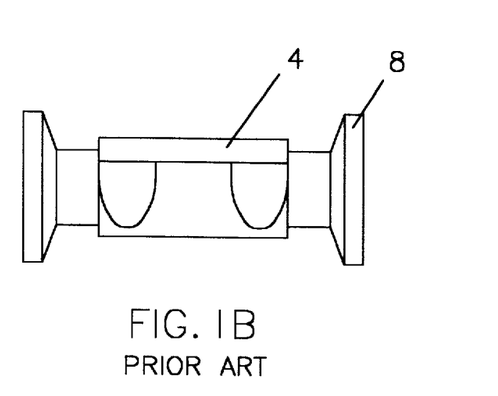
FIG. 1B is a plan view of the bottom plate or valve body isolated from the diaphragm-sealed valve of FIG. 1.

Existing diaphragm-sealed valves of the type shown in FIGS. 1 and 2 do not have any stops. For clarity of illustration, in a conventional valve, FIG. 1A shows the top plate, bonnet 1, isolated from the complete valve of FIG. 1 and FIG. 1B shows the bottom plate, valve body 4, isolated from the complete valve of FIG. 1. Incorporation of a stop or stops 5 between the bonnet and valve body on existing diaphragm-sealed valves limit diaphragm compression and consequently, the diaphragm installed thickness, when the stop directly urges upon the periphery of the bonnet and valve body, during the fastening of these two plates together with the diaphragm placed in between them. FIG. 3 show stops 5 machined to protrude from bonnet 1 and in this example, appear like a leg on each corner, the cross section and perspective views of which are shown respectively in FIGS. 5 and 5A. The claimed invention can be better understood by comparing the bonnet 1 and valve body 4 of the prior art as shown in FIGS. 1A and 1B with the bonnet 1 having one of the stop designs as shown in FIG. 3A. Additionally, FIG. 3C shows the stop shaded and drawn in solid lines with parts of the prior art valve drawn in broken lines. While the stop here is connected or machined on the bonnet or top plate, it can also extend from the bottom plate or valve body, as well as being fabricated independently and introduced as a separate component or part during the assembly of the valve as shown in FIG. 3B. The stops are usually made of the same material as the plates but other materials may be used as long as they can prevent further advancement of the bonnet to the valve body brought about by fasteners such as screws 3.

Figure 5:
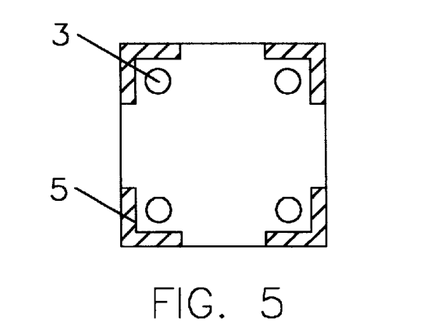
Figure 5A:
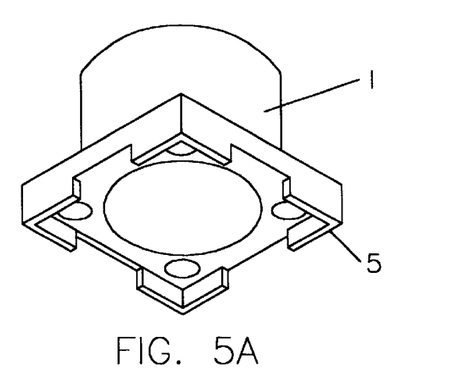
Figure 6:
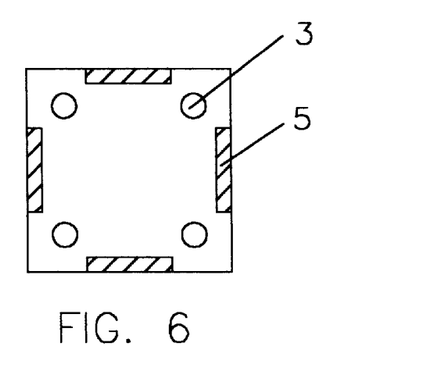
Figure 6A:
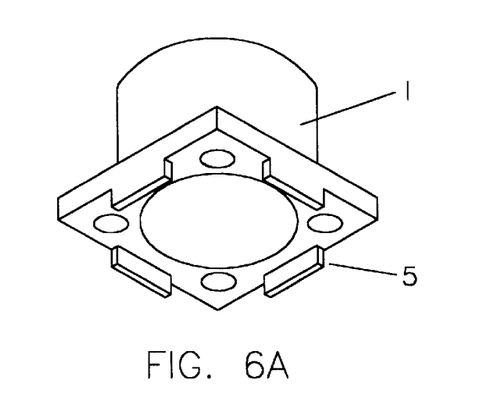
Figure 7:
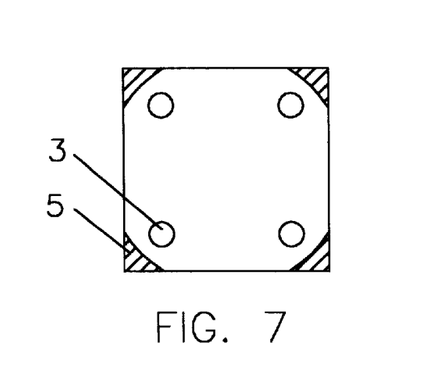
Figure 7A:
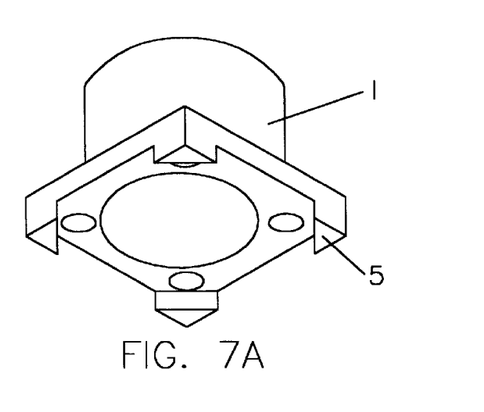
Figure 8:
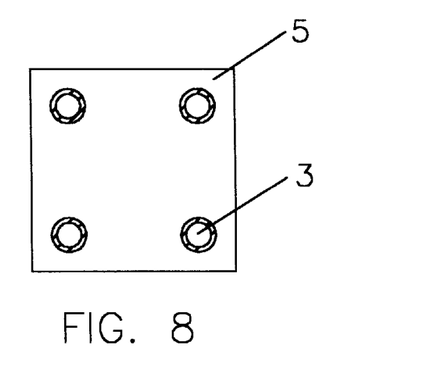
Figure 8A:
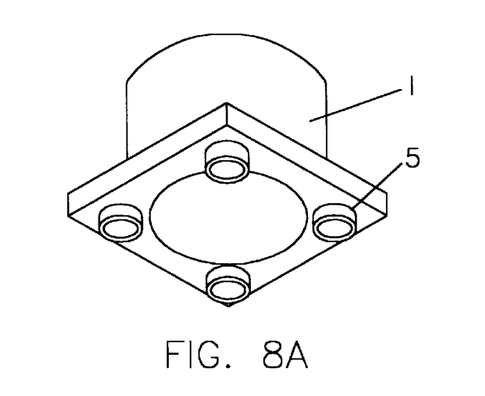
Figure 9:
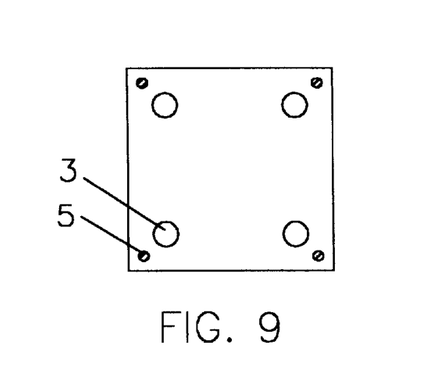
Figure 9A:
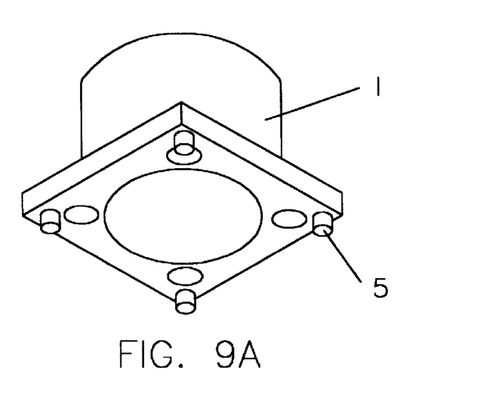
FIG. 9A is a perspective view of a stop shaped like a pin, here shown protruding from the bonnet.
Figure 9B:
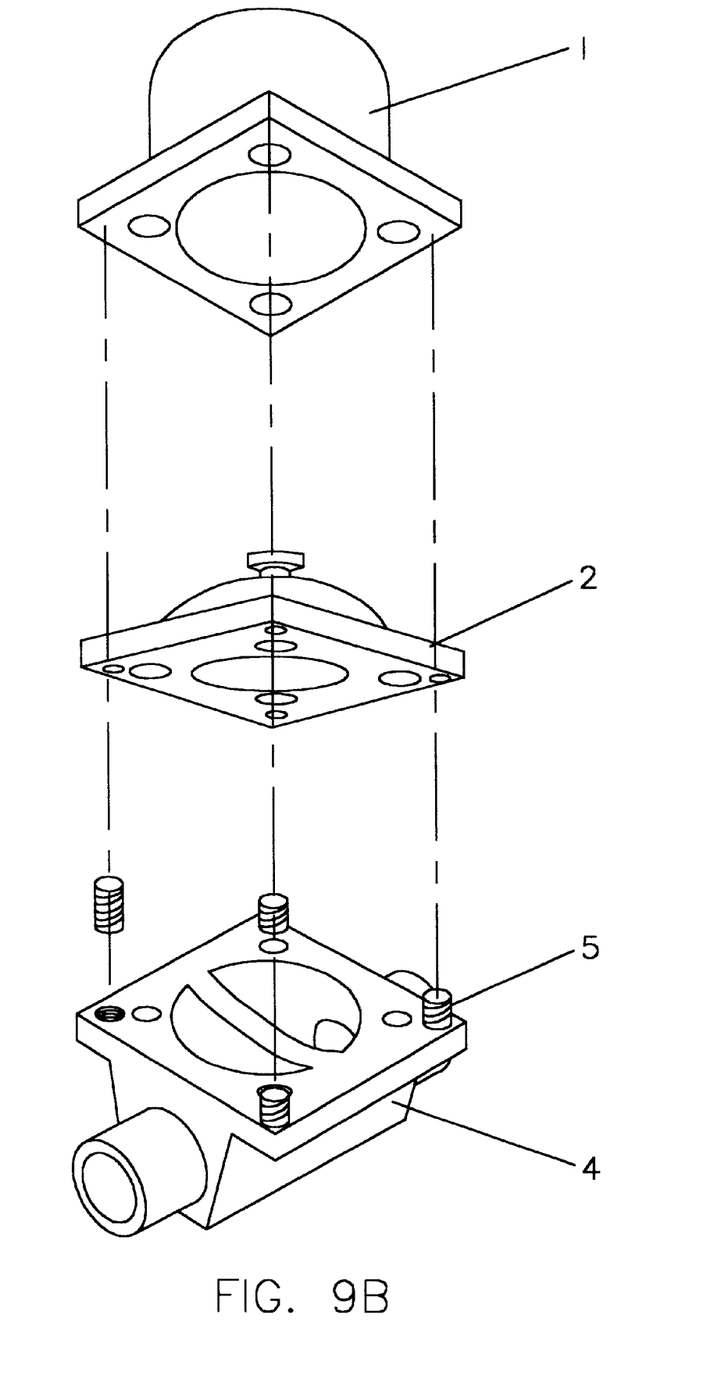
FIG. 9B is an exploded perspective view of a stop shaped like a set screw in a diaphragm valve, the stop herein shown screwed to the valve body, passing through a hole in a peripheral surface of a diaphragm and to an outer surface of the bonnet.

FIG. 4 through FIG. 9 illustrate several, but not all possible methods of incorporating stops (5) into the design FIGS. 4A–9A show the corresponding perspective views of these stops. FIGS. 4–7 show stops incorporated around or on parts of the periphery of a plate. The stops could be machined on either bonnet 1 or valve body 4. It can also be introduced as a separate component or part, for example, in FIG. 4, instead of the stop built-in to protrude from a plate, a four walled piece of metal matching the perimeter of either top or bottom plate so as to surround the periphery of either plate may be placed as a separate part between the two plates during its assembly prior to the plates being fastened to each other. The stops may also be made to surround only parts of the periphery of a plate as shown in FIG. 6. FIG. 5 and 7 shows the stops as four L-shaped or four triangular stops placed to match the shape of each 4 corners of a plate. FIG. 8 shows stops 5 as tubular parts surrounding screws 3 or alternatively, as part of a shoulder screw. Stops shown in FIG. 8, as in the others, may be machined on either the bonnet or the valve body; it may be made integral with the fasteners used for assembling the valve; or, it may be a separate cylindrically shaped materials placed around the screws prior to assembly of the valve. In FIG. 9, stops 5 are in the shape of pins or set screws. A set screw is a screw without a head. Shaped like a pin or set screws means a cylindrical protrusion of a controlled length built in or screwed into the bonnet or valve body as shown in FIGS. 9A and 9B. In these designs, the stop preferably goes through a hole in a peripheral surface of the diaphragm and into the upper surface of the valve body. The pins are of controlled length installed into the valve body, bonnet or diaphragm. These stops may be set to a pre-determined protrusion or designed to allow stop height adjustment. In all of these designs, the height or depth of the stops is proportional to the degree of compression applied on the diaphragm which is placed between the plates and occupying the unshaded areas shown in FIGS. 4–9, central and around but away from any stops 5, during the assembly of the valve.

While the embodiments of the present invention have been described, it should be understood that various changes, adaptations, and modifications may be made therein without departing from the spirit of the invention and the scope of the claims.

What is claimed is:

1. A diaphragm-sealed valve having a controlling means, comprising: a bonnet having in its interior a compressor connected to a stem and a handle, a valve body, a diaphragm between the bonnet and valve body, the diaphragm having an outer and an inner surface; a stop, a solid rigid structure, built-in or added to a peripheral surface of the bonnet or valve body facing the diaphragm and structurally independent of the compressor, the stop separate from the diaphragm; means for fastening the bonnet and valve body; and, means for applying pressure to the bonnet and valve body.

2. The diaphragm-sealed valve of claim 1 wherein the stop surrounds all or part of a periphery of the diaphragm.

3. The diaphragm-sealed valve of claim 1 wherein the stop surrounds a fastener used to assemble the valve body, bonnet, and diaphragm together.

4. The diaphragm-sealed valve of claim 1 wherein the stop is integral with a fastener used to assemble the valve body, bonnet and diaphragm together.

5. The diaphragm-sealed valve of claim 1 wherein the stop is shaped like a pin, a cylindrical protrusion of controlled length installed into the valve body or bonnet from a position away from the outer and inner surfaces of the diaphragm.

6. The diaphragm-sealed valve of claim 1 wherein the stop is a set-screw, assembled into the valve body or bonnet.

7. The diaphragm-sealed valve of claim 6 wherein the set screw allows for stop height adjustment.

8. The diaphragm-sealed valve of claim 6 wherein the set screw is set to a pre-determined protrusion.

9. The diaphragm-sealed valve of claim 1 wherein the stop is a shoulder screw.

10. A diaphragm-sealed valve comprising a bonnet having in its interior a compressor connected to a stem and a handle, a valve body, a diaphragm between the bonnet and valve body, the diaphragm having an outer and an inner surface; means for fastening the bonnet and valve body; means for applying pressure to the bonnet and valve body; and, having as improvement a stop, a solid rigid structure, built-in or added to a peripheral surface of the bonnet or valve body facing the diaphragm and structurally independent of the compressor, the stop separate from the diaphragm.

11. The diaphragm-sealed valve of claim 10 wherein the stop surrounds all or part of a periphery of the diaphragm.

12. The diaphragm-sealed valve of claim 10 wherein the stop surrounds a fastener used to assemble the valve body, bonnet, and diaphragm together.

13. The diaphragm-sealed valve of claim 10 wherein the stop is integral with a fastener used to assemble the valve body, bonnet and diaphragm together.

14. The diaphragm-sealed valve of claim 10 wherein the stop is shaped like a pin, a cylindrical protrusion of controlled length installed into the valve body or bonnet from a position away from the outer and inner surfaces of the diaphragm.

15. The diaphragm-sealed valve of claim 10 wherein the stop is a set-screw, assembled into the valve body or bonnet.

16. The diaphragm-sealed valve of claim 15 wherein the set screw is set to a pre-determined protrusion.

17. The diaphragm-sealed valve of claim 15 wherein the set screw allows for stop height adjustment.

18. The diaphragm-sealed valve of claim 10 wherein the stop is a shoulder screw.

19. A diaphragm-sealed valve having a controlling means, comprising: a bonnet having in its interior a compressor connected to a stem and a handle, a valve body, a diaphragm between the bonnet and valve body, the diaphragm having an outer and an inner surface; a stop component extending continuously from a surface of the bonnet or valve body facing the diaphragm and structurally independent of the compressor, the stop component separate from the diaphragm; means for fastening the bonnet and valve body; and, means for applying pressure to the bonnet and valve body.

* * * * *